United States Patent [19]

Buzak

[11] Patent Number: 4,541,691
[45] Date of Patent: Sep. 17, 1985

[54] ELECTRO-OPTIC SWITCHING SYSTEM USING CIRCULARLY POLARIZED LIGHT

[75] Inventor: Thomas S. Buzak, Beaverton, Oreg.

[73] Assignee: Tektronix, Inc., Beaverton, Oreg.

[21] Appl. No.: 565,441

[22] Filed: Dec. 27, 1983

[51] Int. Cl.$^4$ .......................... G02F 1/01; G02F 1/133
[52] U.S. Cl. .................. 350/335; 350/347 R; 350/377; 350/387
[58] Field of Search ............... 350/357 R, 347 E, 335, 350/377, 378, 387, 388

[56] References Cited

U.S. PATENT DOCUMENTS

| | | | |
|---|---|---|---|
| 2,753,763 | 7/1956 | Haines | 350/388 |
| 2,834,254 | 5/1958 | Sage | 350/388 X |
| 3,272,988 | 9/1966 | Bloom et al. | 350/377 X |
| 3,558,215 | 1/1971 | Lang et al. | 350/377 X |
| 3,785,721 | 1/1974 | Harsch | 350/347 E |
| 4,017,156 | 4/1977 | Moriyama et al. | 350/347 R |
| 4,097,128 | 6/1978 | Matsumoto et al. | 350/335 |
| 4,398,803 | 8/1983 | Pohl et al. | 350/347 R X |
| 4,408,839 | 10/1983 | Wiener-Avnear | 350/347 R |
| 4,497,542 | 2/1985 | Kaye | 350/335 |

Primary Examiner—John K. Corbin
Assistant Examiner—David Lewis
Attorney, Agent, or Firm—John D. Winkelman; Paul S. Angello

[57] ABSTRACT

A method and an apparatus provide an optical switching system (100) which maintains essentially constant transmissivity at its maximum value and develops independent of viewing angle two system optical transmission states of substantially contaminant-free light. The system includes first and second light gates (102 and 104) of which each has associated therewith contaminant light intensity patterns (48 and 66) with points of local maxima (54, 56, 58, 60, 68, and 70) and local minima (62 and 72) in two system optical transmission states. Quarter-wave plates (134 and 136) are positioned between the light gates to develop circular polarization of light propagating between them. The presence of circularly polarized light maintains the system transmissivity at its maximum value while the relative orientation of the light gates is changed to align their contaminant light intensity patterns to block the transmission of contaminant light, and thereby improve the viewing angle performance.

12 Claims, 17 Drawing Figures

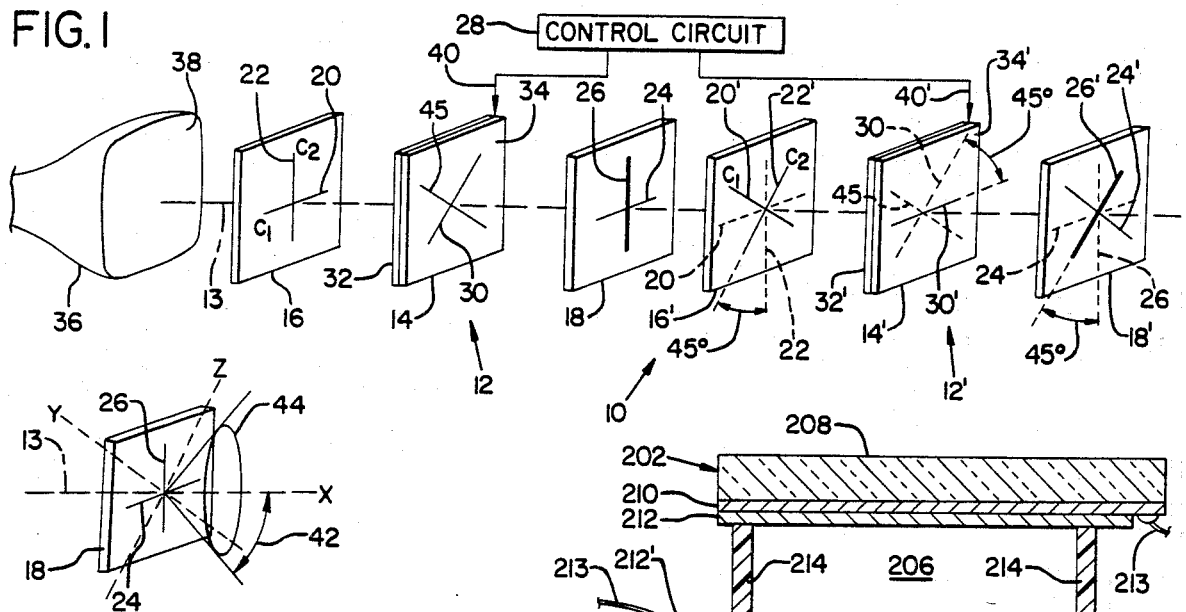
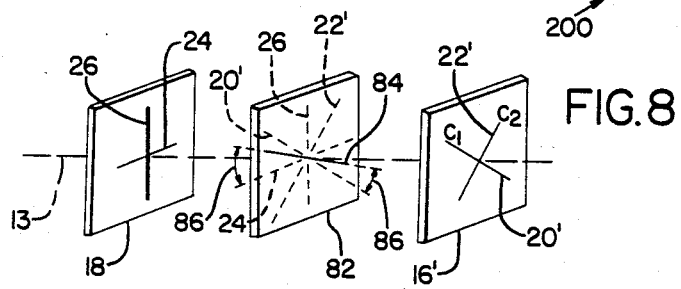
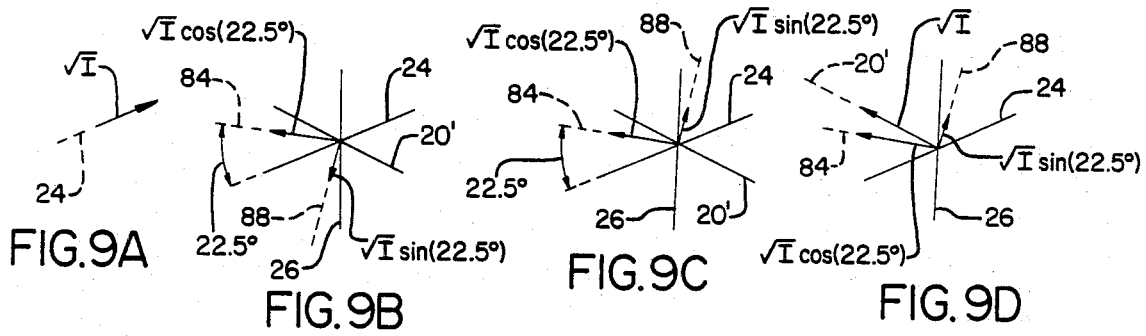
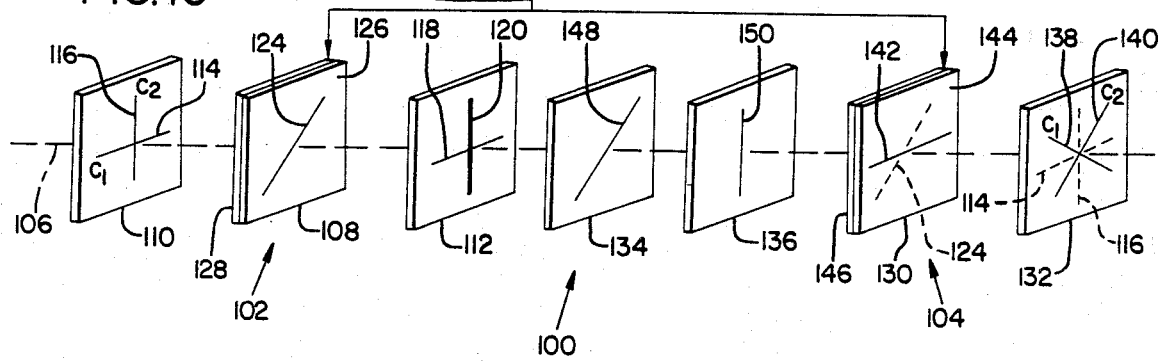

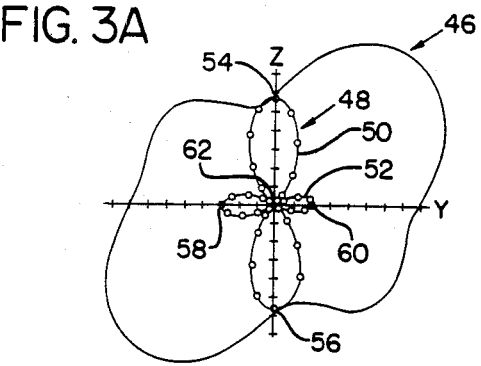
FIG. 3A
INTENSITY VS. AZIMUTHAL ANGLE
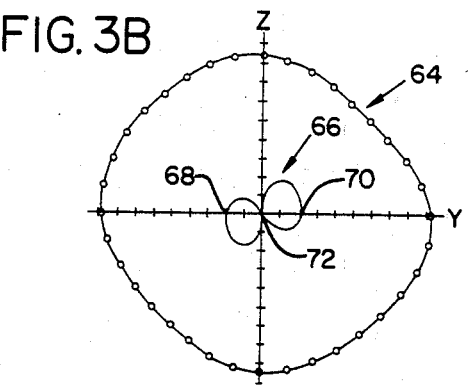
FIG. 3B
INTENSITY VS. AZIMUTHAL ANGLE
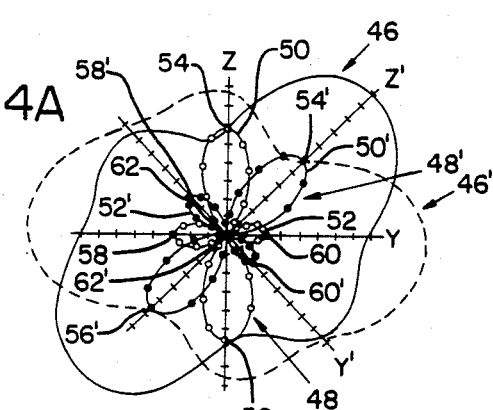
FIG. 4A
INTENSITY VS. AZIMUTHAL ANGLE
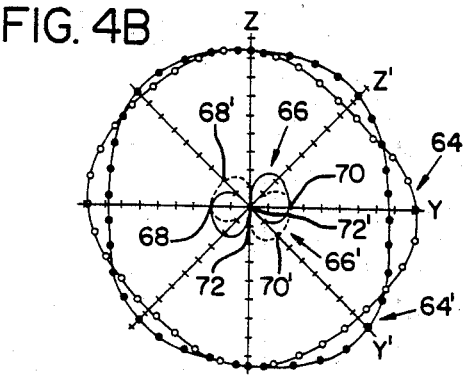
FIG. 4B
INTENSITY VS. AZIMUTHAL ANGLE
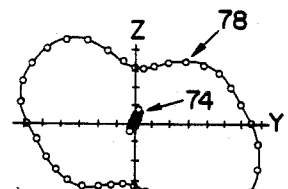
FIG. 5A
INTENSITY VS. AZIMUTHAL ANGLE
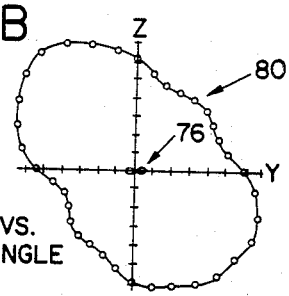
FIG. 5B
INTENSITY VS. AZIMUTHAL ANGLE
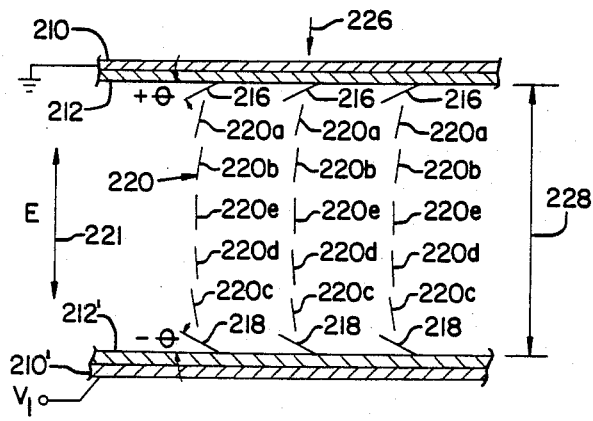
FIG. 7A (ON)
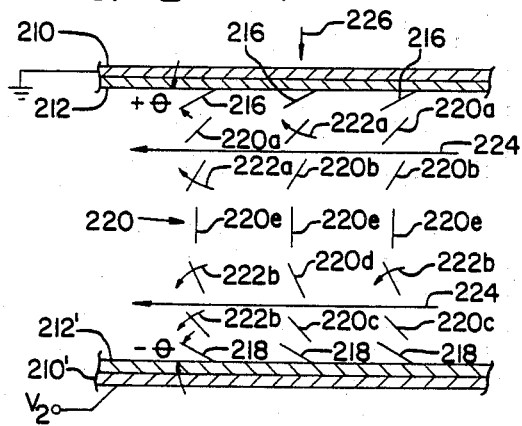
FIG. 7B (OFF)

ELECTRO-OPTIC SWITCHING SYSTEM USING CIRCULARLY POLARIZED LIGHT

TECHNICAL FIELD

This invention relates to optical switches, and in particular, a method and an apparatus for an optical switching system which utilizes circularly polarized light to develop independent of viewing angle an optical transmission state of substantially contaminant-free light in a system whose transmissivity remains essentially constant at its maximum value.

BACKGROUND OF THE INVENTION

An optical switching system employing an electro-optic device which exhibits the effects of birefringence, such as a liquid crystal cell, does not transmit light of uniform intensity when the system output is observed from different locations along a viewing cone defined at an angle measured relative to the axis or path of the transmitted light. The nonuniform intensity of light changes the contrast of the display and is caused by the spurious transmission of contaminant light whose intensity varies as a function of azimuthal angle along the viewing cone. In the case of an optical switching system which develops two optical transmission states of light of different colors, the effect of birefringence is that light rays exiting the system in either one of its optical transmission states includes contaminant light rays of the color of the other optical transmission state which vary in intensity at different locations along the viewing cone.

There have been known heretofore methods and apparatus for improving the off-axis viewing angle performance of optical switches incorporating electro-optic devices which comprise birefringent materials. One class of patents discloses methods and apparatus for improving the viewing angle characteristics of twisted nematic liquid crystal display devices.

In particular, U.S. Pat. No. 4,385,806 of Fergason discloses the introduction into a twisted nematic liquid crystal assembly of at least two retardation plate devices arranged in a particular manner to improve the off-axis viewing angle performance of the device.

U.S. Pat. No. 4,192,060 of Washizuka et al. discloses a twisted nematic liquid crystal cell whose transparent electrodes have undergone a horizontal orientation rubbing process to obtain a preferred director alignment and thereby improve the viewing angle characteristics of the liquid crystal cell.

U.S. Pat. No. 4,183,630 of Funada et al. discloses the use of a fiber plate which includes a plurality of optical fibers positioned adjacent the outer surface of one of a pair of substrates which form an inclusion for a layer of twisted nematic liquid crystal material. The use of the fiber plate is said to preserve the uniformity of display contrast as the voltage applied to the liquid crystal cell is reduced.

U.S. Pat. No. 4,120,567 of Goodman et al. discloses the method for increasing the viewing angle of a twisted nematic liquid crystal cell by increasing the ratio of the voltage applied to the cell to its threshold voltage.

U.S. Pat. No. 3,966,305 of Young discloses the deposition of a dielectric layer between the patterned conductive layer and the director alignment film of a twisted nematic liquid crystal display device in an attempt to improve the viewing angle of the display.

A second class of patents discloses techniques directed to either filtering undesirable ambient light or introducing a source of back-lighting to enhance display contrast and thereby provide a more desirable viewing angle.

In particular, U.S. Pat. No. 3,887,791 of Kitchens discloses the use of a prism overlaying display cells positioned in a casing to alter the angle of light transmission of the display images and thereby provide an improved viewing angle. The use of a prism, however, only shifts the angle of transmission of the display and filters undesirable ambient light. The prism does not correct for nonuniform contrast as the display is observed from different azimuthal angles of a particular cone of view.

U.S. Pat. No. 3,869,195 of Aldrich et al. discloses the use of segmented back-lighting of a liquid crystal display as a means to improve the viewing angle thereof. The source of segmented back-lighting is an electroluminescent layer in which one transparent electrode applied to the electroluminescent material is segmented to coincide with the segmentation of the liquid crystal panel. The effect is to provide high intensity contrast between the activated display segments and the nonactivated areas of the display over a wide range of ambient light conditions.

A third class of patents discloses the use of ancillary optical components with optical switching systems to enhance display contrast.

Included in this class of patents is U.S. Pat. No. 4,088,400 of Assouline et al. which discloses an electro-optical display device having positioned adjacent its exit polarizer a diffuser element in association with an additional polarizer to improve the viewing angle of the display without loss of contrast. A pair of cuarter-wave plates are disposed on either side of the diffuser element to eliminate back-scattering of ambient light to the observer's eye. The method of Assouline et al. appears to be inapplicable for increasing the contrast of reflection-type liquid crystal displays.

U.S. Pat. No. 3,838,906 of Kumada discloses an optical switch comprising an electro-optic crystal and a birefringent crystal arranged in cascade in a manner such that the sign of the birefringence of the former is opposite to that of the latter. Kumada states that this arrangement of electro-optic devices provides an optical switch which can effectively block in its opaque output state light having an incident angle as great as 30°.

SUMMARY OF THE INVENTION

One of the objects of this invention is to provide a method for producing an optical switching system which maintains essentially constant transmissivity at its maximum value and develops independent of viewing angle an optical transmission state of substantially contaminant-free light.

Another object of this invention is to provide such a method which introduces circular polarization of and removes the circular polarization from light rays propagating between a pair of electro-optic devices included within the system to permit without a change in system transmissivity the orientation of a contaminant light intensity pattern associated with either one of the electro-optical devices to block the transmission of contaminant light associated with the other electro-optic device.

A further object of this invention is to provide such a method which improves the viewing angle characteristics of optical switching systems employing electro-optic devices of different types.

Still another object of this invention is to provide such a method which develops in an optical switching system independent of viewing angle two system optical transmission states of substantially contaminant-free colored light.

Yet another object of this invention is to provide an optical switching system which maintains essentially constant transmissivity and develops a system optical transmission state of substantially contaminant-free light in accordance with the method of the present invention.

The present invention relates to a method and an apparatus for an optical switching system which maintain essentially constant transmissivity at its maximum value and develops independent of viewing angle an optical transmission state of substantially contaminant-free light. The method of the present invention entails the use of a light gate which includes a first electro-optic device means that is capable of changing the sense of the polarization state of light passing therethrough. The first light gate is in optical communication with a source of light and develops an optical transmission state of light having associated therewith a contaminant light intensity pattern with points of local minima and maxima.

A second light gate includes a second electro-optic device means which is also capable of changing the sense of polarization of light passing therethrough. The second light gate is positioned along an optical path to receive the light rays exiting the first light gate and develops an optical transmission state having associated therewith a contaminant light intensity pattern with points of local minima and maxima.

In a preferred embodiment of the present invention, the first and second electro-optic device means rotate the direction of linearly polarized light. Circular polarization is introduced into and removed from the light rays propagating between the first and second electro-optic devices. In a preferred embodiment, the introduction and removal of circular polarization is accomplished by positioning, respectively, a first quarter-wave plate downstream of the first electro-optic device means and a second quarter-wave plate upstream of the second electro-optic device means.

The contaminant light intensity patterns of the first and second light gates are oriented so that the points of local minima and maxima of the contaminant light intensity pattern of one of the light gates generally align with the respective points of maxima and minima of the contaminant light intensity pattern of the other light gate. The orientation of the patterns is accomplished by dividing the optical switching system into first and second sections and adjusting their relative angular position about the optical path. The first section comprises the first electro-optic device means and the first quarter-wave plate, and the second section comprises the second electro-optic device means and the second quarter-wave plate.

Circularly polarized light exits the first section and enters the second section. Since the intensity of circularly polarized light is the same for all azimuths about the optical path, the change in angular orientation of the sections to align the contaminant light intensity pattern does not affect the transmissivity of the optical switching system.

The above-described method for alignment of the contaminant light intensity patterns, therefore, provides independent of viewing angle an optical transmission state of substantially contaminant-free light in a system whose transmissivity remains essentially constant at its maximum value.

A preferred embodiment of the apparatus of the present invention comprises first and second light gates of which each one includes at least one linear polarizing filter means having orthogonally aligned polarization axes and one electro-optic device means which is capable of changing the direction of polarization of light rays passing therethrough. The second light gate is of a design similar to that of the first light gate and is positioned along an optical path to receive the polarized light rays exiting the first light gate. A pair of quarter-wave plate devices is disposed face-to-face between the first and second light gates to introduce circular polarization of the light rays exiting the first light gate and remove the circular polarization from light rays entering the second light gate. The switchable transmission system is divided into two sections each of which comprising a light gate and one quarter-wave plate. The relative angular position of the sections is oriented axially about the optical path so that the points of high attenuation of the contaminant light intensity pattern of one of the light gates generally overlap the points of low attenuation of the contaminant light intensity pattern of the other light gate such that the contaminant light rays from both light gates are blocked. Aligning the sections at the interface where the circularly polarized light propagates between them maintains the overall transmissivity of the optical switching system at its maximum value.

In a preferred embodiment, the electro-optic device means comprise variable optical retarders having substantially the same contaminant light intensity patterns. Whenever the light gates comprise color selective linear polarizing filter means, the optical switching system develops independent of viewing angle system two optical transmission states of light of different pure colors. Whenever the light gates comprise only neutral linear polarizing filter means, the optical switching system develops independent of viewing angle an opague system optical transmission state through which essentially no spurious light is transmitted and a system optical transmission state of substantially contaminant-free light.

The principles of operation underlying the present invention are applicable to optical switching systems comprising in whole or in part electro-optic devices other than variable optical retarders, such as, for example, twisted nematic liquid crystal devices. The best performance is obtained, however, from optical switching systems incorporating electro-optic devices of the same type.

Additional objects and advantages of the present invention will be apparent from the following detailed description of a preferred embodiment thereof, which proceeds with reference to the accompanying drawings.

BRIEF DESCRIPTION OF THE DRAWINGS

FIG. 1 is a diagram of an exemplary optical switching system which embodies the principles of operation underlying the method of the present invention and develops two optical transmission states of light of different colors.

FIG. 2 is a diagram of the cone of view for a polar angle of 40° at the output of a light gate included in the optical switching system of FIG. 1.

FIGS. 3A and 3B are superimposed contaminant color and nominal color light intensity patterns measured at a polar viewing angle of 40° at the output of either one of the light gates of FIG. 1 in, respectively, the first optical transmission state and the second optical transmission state.

FIGS. 4A and 4B show the relative orientation of the superimposed contaminant color and nominal color light intensity patterns of FIGS. 3A and 3B for the pair of light gates of the optical switching system of FIG. 1 in, respectively, the first optical transmission state and the second optical transmission state.

FIGS. 5A and 5B are superimposed contaminant color and nominal color light intensity patterns which represent the light intensity patterns of the optical switching system of FIG. 1 in, respectively, the first optical transmission state and the second optical transmission state.

FIG. 6 is a diagrammatic cross-sectional side elevation view of the liquid crystal cell which is used as a zero to substantially half-wave optical retarder in a preferred embodiment of the present invention.

FIGS. 7A and 7B are schematic diagrams of the director alignment configuration of the liquid crystal cell of the zero to substantially half-wave optical retarder incorporated in a preferred embodiment of the optical switching system of the present invention in, respectively, the field aligned "ON" state and the partly relaxed "OFF" state.

FIG. 8 is a diagram showing the orientation of a light intensity-compensating half-wave plate positioned between the output of the first light gate and the input of the second light gate of the optical switching system of FIG. 1.

FIGS. 9A–9D show the light intensity compensation effect of the half-wave plate as depicted in FIG. 8 on the electric field vector of a light ray, respectively, exiting the first light gate, entering the half-wave plate, exiting the half-wave plate, and entering the second light gate.

FIG. 10 is a diagram of a preferred embodiment of an optical switching system comprising a pair of light gates separated by a pair of quarter-wave plates which develop circularly polarized light at their interface in accordance with the present invention.

DETAILED DESCRIPTION OF PREFERRED EMBODIMENT

Light Gate Operation

The principles of operation underlying one aspect of the method of the present invention are described by way of an exemplary optical switching system 10 which develops two optical transmission states of light of different colors and is shown in FIG. 1. With reference to FIG. 1, optical switching system 10 includes a pair of light gates 12 and 12' which are of similar design and are positioned in series arrangement along optical path 13. As will be further hereinafter described, light gates 12 and 12' differ only in the relative angular orientation about optic axis 13 of the optical components of one light gate and those of the other light gate. The following description of the configuration of the optical components and operation of light gate 12 is similarly applicable to light gate 12'. The elements of light gate 12' which correspond to those of light gate 12 are designated with identical reference numerals followed by primes.

Light gate 12 includes variable optical retarder 14 which is disposed between a pair of linear polarizing filters or means 16 and 18, each having orthogonally aligned polarization axes. Variable optical retarder 14 constitutes an electro-optic device means which is capable of changing the sense of the polarization state of light rays passing therethrough. Polarizing filter 16 has a color selective horizontal polarization axis 20 which passes light of a first color $C_1$, such as green, and a color selective vertical polarization axis 22 which passes light of a second color $C_2$, such as red. Polarizing filter 18 is a neutral polarizing filter and has a light transmitting horizontal polarization axis 24 which passes white light and light absorbing vertical polarization axis 26 which passes no light.

Variable optical retarder 14 is a nematic liquid crystal cell and comprises a zero to substantially half-wave optical retarder which selectively provides nearly zero retardation for normally incident light of all colors and substantially half-wave retardation of normally incident light of a preselected color in response to a change in magnitude of an AC voltage which is applied to the cell by control circuit 28. For reasons relating not to the presence of contaminant light due to viewing angle but only to the light gate operation, which is described hereinbelow, variable optical retarder 14 is designed to provide substantially half-wave optical retardation of green light in order to develop at the output of light gate 12 two optical transmission states of light of different pure colors.

The projection 30 of the optic axis of variable optical retarder 14 on each of its two light communicating surfaces 32 and 34 is disposed substantially at a 45° angle with respect to each one of the polarization axes of polarizing filters 16 and 18.

The light gate formed by polarizing filters 16 and 18 and variable optical retarder 14 is positioned in front of a light source 36, which emits light of many wavelengths including those of the colors green and red. Light source 36 can be, for example, a cathode ray tube or a projection device which provides a black and white display image on its phosphor screen 38.

Variable optical retarder 14 is switched between two optical retardation states, the "ON" state which provides nearly zero retardation of normally incident light and the "OFF" state which provides substantially half-wave retardation for normally incident light of a particular predetermined wavelength. The two optical retardation states provide light gate 12 with two optical transmission states for developing light of different colors.

Whenever variable optical retarder 14 is commanded to the "ON" optical retardation state by a voltage signal applied to output conductor 40 of control circuit 28, the directions of polarization of light rays of the colors green and red passing therethrough remain unchanged. Normally incident light rays of the color red passing through vertical polarization axis 22 of polarizing filter 16 are absorbed by vertical polarization axis 26 of polarizing filter 18. Normally incident light rays of the color green passing through horizontal polarization axis 20 of polarizing filter 16 exit light gate 12 through horizontal polarization axis 24 of polarizing filter 18. Green light exits light gate 12 in its first optical transmission state.

Whenever variable optical retarder 14 is commanded to the "OFF" optical retardation state by a voltage signal applied to output conductor 40 of control circuit 28, the direction of polarization of light rays of the color green passing through horizontal polarization axis 20 of polarizing filter 16 is rotated 90° by variable optical retarder 14. The light rays of the color green are absorbed by vertical polarization axis 26 of polarizing filter 18.

Since variable optical retarder 14 in the "OFF" optical retardation state does not provide substantially half-wave retardation of light rays of colors other than green, the direction of polarization of light rays of the color red passing through vertical polarization axis 22 of polarizing filter 16 is rotated at an angle which is slightly different from 90° by variable optical retarder 14. Light rays of the color red, therefore, are separated into components which lie along the vertical and horizontal polarization axes of polarizing filter 18. Light rays of the color red include major components of light projected onto and transmitted by horizontal polarization axis 24 and minor components of light projected onto and absorbed by vertical polarization axis 26 of polarizing filter 18. Red light exits light gate 12 in its second optical transmission state. The slight amount of red light absorbed by vertical polarization axis 26 of polarizing filter 18 results in a virtually imperceptible diminution in red light intensity in the second optical transmission state as respects the green light intensity in the first optical transmission state.

Contaminant and Nominal Light Intensity Patterns

The light rays exiting polarizing filter 18 of light gate 12 in both the first and second optical transmission states appear to be of pure color quality to an observer whose line of sight or viewing angle is normal to the surface of polarizing filter 18. When observed from a viewing angle other than normal to the surface of polarizing filter 18, the light rays exiting light gate 12 in either one of its optical transmission states includes contaminant light rays of the color of the other optical transmission state.

FIG. 2 shows for a polar angle 42 of 40° the cone of view 44 for an observer of the light rays exiting polarizing filter 18. FIGS. 3A and 3B show superimposed contaminant color and nominal color light intensity patterns represented as a function of azimuthal angle at a polar viewing angle of 40°. The Z and Y axes of FIGS. 3A and 3B coincide with, respectively, projection 30 of the optic axis and projection 45 of the axis perpendicular to projection 30 of the optic axis of variable optical retarder 14.

FIG. 3A shows superimposed intensity patterns of green and red light exiting polarizing filter 18 when light gate 12 is in its first optical transmission state. Pattern 46 represents the intensity of green light, and pattern 48 represents the intensity of the contaminant red light. Pattern 48 resembles the outline of a pair of orthogonally oriented figure eight shapes 50 and 52 which are aligned generally symmetrically about the respective Z and Y axes. Figure eight shape 50 has points local maxima at locations 54 and 56, and figure eight shape 52 has points of local maxima at locations 58 and 60. Both of the figure eight shapes 50 and 52 have points of local minima located approximately at the point of intersection 62 of the Z and Y axes. Intersection point 62 represents the point of convergence of each of the intensity nulls of the four lobes of pattern 48. Since the intensity varies as a function of azimuthal angle, the intensity nulls occur at azimuthal angles measured at approximately 45° with respect to the Z and Y axes. It is readily noted that the contaminant red light intensity at locations 54 and 56 of figure eight shape 50 equal that of the intended green light output. The shapes of the outlines of patterns 46 and 48 are characteristic of those exhibited by liquid crystal cells of various types.

FIG. 3B shows superimposed intensity patterns of green and red light exiting polarizing filter 18 when light gate 12 is in its second optical transmission state. Pattern 64 represents the intensity of red light, and pattern 66 represents the intensity of contaminant green light. Pattern 66 resembles the outline of a figure eight shape generally aligned about the Y axis. Pattern 66 has points of local maxima at locations 68 and 70 and points of local minima located at approximately at the point of intersection 72 of the Z and Y axes. Intersection point 72 represents the point of convergence of each of the intensity nulls of the two lobes of pattern 66. It is readily noted that the rate of diminution of contaminant light intensity from the points of local maxima is less rapid in the second optical transmission state than in the first optical transmission state. The number, orientation, and shape of the lobes included in the outlines of patterns 64 and 66 are unique to the liquid crystal cell of the preferred embodiment of the variable optical retarder whose construction and method of operation are described hereinbelow.

Alignment of Light Intensity Patterns

With reference to FIG. 1, the method of the present invention comprises the steps of positioning light gate 12' at the output of light gate 12 along optical path 13 to receive the polarized light rays exiting therefrom. Voltage signals applied to output conductor 40' of control circuit 28 command variable optical retarder 14' to its "ON" and "OFF" optical retardation states in synchronism with variable optical retarder 14. The corresponding optical components of light gates 12 and 12' are of similar design so that color selective polarizing filter 16' passes green light through polarization axis 20' and red light through polarization axis 22', neutral polarizing filter 18' passes light of all wavelengths through polarization axis 24' and absorbs light of all wavelengths by polarization axis 26', and variable optical retarder 14' provides substantially half-wave optical retardation of green light. As will be described hereinbelow, light gate 12' develops in its first and second optical transmission states an output of, respectively, green light and red light.

Light gate 12' is oriented relative to light gate 12 such that the projection 30 of the optic axis of variable optical retarder 14 is disposed at a 45° angle with respect to the projection 30' of the optic axis of variable optical retarder 14' and the polarization axes of polarizing filters 16 and 18 are disposed at 45° angles with respect to the polarization axes of polarizing filters 16' and 18'. The polarization axes and projection of the optic axis of the optical components of light gate 12 are shown in phantom on the corresponding optical components of light gate 12' to illustrate the above-described relative alignment.

Whenever variable optical retarders 14 and 14' are commanded to the "ON" optical retardation state, light rays of the color green exit light gate 12 through horizontal polarization axis 24 of polarizing filter 18 and enter light gate 12' by striking polarizing filter 16'. Normally incident light rays of the color green have equal components which strike polarization axes 20' and 22' of polarizing filter 16'. The components of green light striking polarization axis 22' are absorbed, and the components of green light striking polarization axis 20' are transmitted through polarizing filter 16'. Variable optical retarder 14' in the "ON" optical retardation state imparts no change in the direction of polarization of light rays passing therethrough; therefore, light rays of the color green exit light gate 12' and optical switching system 10 through polarization axis 24' of polarizing filter 18'.

It is apparent that the relative orientation of light gates 12 and 12' in accordance with the present invention causes 50% of the green light to be absorbed by polarization axis 22' of polarizing filter 18', and thereby a 50% reduction in green light intensity at the output of optical switching system 10 in the first optical transmission state.

Whenever variable optical retarders 14 and 14' are commanded to the "OFF" optical retardation state, light rays of the color red exit light gate 12 through horizontal polarization axis 24 of polarizing filter 18 and enter light gate 12' by striking polarizing filter 16'. Normally incident light rays of the color red have equal components which strike polarization axes 20' and 22' of polarizing filter 16'. The components of red light striking polarization axis 20' are absorbed, and the components of red light striking polarization axis 22' are transmitted through polarizing filter 16'. Since variable optical retarder 14' in the "OFF" optical retardation state does not provide substantially half-wave retardation of light rays of colors other than green, the direction of polarization of light rays of the color red passing through polarization axis 22' of polarizing filter 16' is rotated at an angle which is slightly different from 90° by variable optical retarder 14'. Light rays of the color red, therefore, are separated into components which lie along the polarization axes of polarizing filter 18'. Light rays of the color red include major components of light projected onto and transmitted by polarization axis 24' and minor components of light projected onto and absorbed by polarization axis 26' of polarizing filter 18'.

It is apparent that the relative orientation of light gates 12 and 12' in accordance with the present invention causes 50% of the red light to be absorbed by polarization axis 20' of polarizing filter 18', and thereby a 50% reduction in red light intensity at the output of optical switching system 10 in the second optical transmission state. The slight amount of red light absorbed by polarization axis 26' of polarizing filter 18' does not appreciably diminish the red light intensity in the second optical transmission state.

FIGS. 4A and 4B show the relative orientations of the superimposed contaminant color and nominal color light intensity patterns for the arrangement shown in FIG. 1 of light gates 12 and 12' in, respectively, the first optical transmission state and the second optical transmission state. The pertinent features of the light intensity patterns of light gate 12' corresponding to those of light gate 12 are designated in FIGS. 4A and 4B with identical reference numerals followed by primes.

With reference to FIG. 4A, the light intensity patterns associated with the first optical transmission states of light gates 12 and 12' are aligned such that locations 54' and 56' of the points of local maxima of figure eight shape 50' and locations 58' and 60' of the points of local maxima of figure eight shape 52' are all generally aligned with location 62 of the points of local minima. Similarly, locations 54 and 56 of the points of local maxima of figure eight shape 50 and locations 58 and 60 of the points of local maxima of figure eight shape 52 are all generally aligned with location 62' of the points of local minima. The points of local minima of a light intensity pattern define points of substantial attentuation of light intensity; therefore, aligning the points of high intensity contaminant light of either one of the light gates with the points of substantial attenuation light intensity of the other light gate effectively blocks the contaminant red light from exiting polarizing filter 18' of optical switching system 10.

With reference to FIG. 4B, the light intensity patterns associated with the second optical transmission states of light gates 12 and 12' are aligned such that locations 68' and 70' of the points of local maxima of figure eight shape 66' are generally aligned with location 72 of the points of local minima. Similarly, locations 68 and 70 of the points of local maxima of figure eight shape 66 are generally aligned with location 72' of the points of local minima. In a manner analogous to that described for the first optical transmission state, the points of local minima are aligned with the points of local maxima to block the transmission of contaminant green light from exiting polarizing filter 18' of optical switching system 10.

The light intensity patterns are preferably aligned to obtain the best reduction of contaminant light exiting system 10 in the first optical transmission state. The consequent reduction of contaminant light intensity in the second optical transmission state is realized primarily because of the lesser amount of contaminant light separately transmitted by each one of light gates 12 and 12'.

With reference to FIGS. 5A and 5B, the light intensity patterns 74 and 76 shown at the intersection of the Z and Y axes represents the resultant contaminant light intensity patterns of optical switching system 10 in, respectively, the first optical transmission state and the second optical transmission state. The amount of contaminant light exiting system 10, therefore, is negligible in both the first and second optical transmission states for polar angles within a range of between 0° and at least 40°. It has been demonstrated that good viewing angle performance can be obtained with the present invention for polar angles as great as 55°. Patterns 78 and 80 represent the resultant intensity of, respectively, green light in the first optical transmission state and red light in the second optical transmission state of optical switching system 10.

The foregoing discussion directed to the optical switching system 10 which provides two optical transmission states of light of different colors is applicable to such a system which provides an opaque optical transmission state. Optical switching system 10 is modified by substituting a neutral linear polarizing filter for each one of color selective polarizing filters 16 and 16' to produce an alternative optical switching system having a single light output optical transmission state and an opaque optical transmission state. The absorption axis of the substituted neutral polarizing filter in each light gate is orthogonally disposed to that of the existing neutral polarizing filter of the same light gate. The variable optical retarders are tuned to provide substantially half-wave retardation of a wavelength of light in the mid-range of the visible spectrum.

Whenever the variable optical retarders are in the "ON" optical retardation state, the alternative optical switching system transmits no light through its output filter. Whenever the variable optical retarders are in the "OFF" optical retardation state, the alternative optical switching system transmits white light through its output filter. Each separate light gate manifests the presence of contaminant light as a loss of contrast in the single light output optical transmission state and as the presence of spurious light in the opaque optical transmission state. The arrangement of the light gates in accordance with the method of the present invention virtually eliminates the presence of contaminant light in both optical transmission states.

It will be appreciated by those having ordinary skill in the art that the above-described contaminant light intensity compensation method can be applied to a reflective type as well as a transmissive type optical switching system.

Maintenance of Transmissivity at Maximum Value

It is apparent that the above-described orientation of light gates 12 and 12' provides an improvement in viewing angle performance at the expense of a 50% reduction in light intensity at the output of system 10 in both the first and second optical transmission states. This reduction in light intensity can be rectified with the placement of a half-wave plate 82 between the output of light gate 12 and the input of light gate 12'. Half-wave plate 82 is preferably tuned to provide half-wave retardation of light rays of a midrange color between green and red.

FIG. 8 shows the orientation of the optic axis 84 of half-wave plate 82 and the polarization axes of polarizing filters 18 and 16', which axes are depicted in phantom on half-wave plate 82. With reference to FIG. 8, optic axis 84 is positioned at angles 86 of 22.5° relative to polarization axes 24 and 20' of polarizers 18 and 16', respectively. That this particular orientation maintains the transmissivity of optical switching system 10 at its maximum value is demonstrated with reference to FIGS. 9A–9D and the following explanation.

With reference to FIGS. 9A–9D, a light ray of intensity "I" exiting horizontal polarization axis 24 of polarizing filter 18 has an electric field vector $\sqrt{I}$ (FIG. 9A) which is projected onto the surface of half-wave plate 82 and is separated into orthogonal components (FIG. 9B). The amplitude of the component projected onto the optic axis 84 of half-wave plate 82 equals $\sqrt{I}$ cos (22.5°) and the amplitude of the component projected in the direction 88 perpendicular to optic axis 84 equals $\sqrt{I}$ sin (22.5°). After exiting half-wave plate 82, the latter component changes its direction by 180° (FIG. 9C) and both components by vector addition form a resultant electric field vector along polarization axis 20' of polarizing filter 16' (FIG. 9D). The amplitude of the resultant electric field vector equals $$\sqrt{I}(\cos(22.5°)\cos(22.5°)+\sin(22.5°)\sin(22.5°))=\sqrt{I}.$$

The intensity of light transmitted by polarizing filter 16', therefore, equals I and is the same as that which exited polarizing filter 18. The direction of polarization of light rays passing through variable optical retarder 14' will strike the polarization axes of polarizing filter 18' in the same manner as those striking polarizing filter 18 of light gate 12. There will be, therefore, no separation of light rays into equal components along the polarization axes of polarizing filter 16'.

Preferred Embodiment of Optical Switching System

FIG. 10 is a diagram of a preferred embodiment of an optical switching system which incorporates the principles of operation described with reference to the exemplary system shown in FIG. 1. To overcome the diminution of light intensity inherent in the exemplary system, the preferred embodiment manifests a second aspect of the present invention by employing circular polarization of the light rays propagating between the pair of light gates to maintain the system transmissivity at its maximum value while the relative orientation of the light gates is changed to block the transmission of contaminant light.

With reference to FIG. 10, optical switching system 100 includes a pair of light gates 102 and 104 which are positioned in series arrangement along optical path 106. Light gate 102 is of a design similar to that of light gate 12 of FIG. 1. Light gate 102 is positioned to receive light rays from a light source (not shown) and includes variable optical retarder 108 which is positioned between linear polarizing filters 110 and 112, each having orthogonally aligned polarization axes. Polarizing filters 110 and 112 comprise the light polarizing system of light gate 102. Polarizing filter 110 has color selective horizontal polarization axis 114 which passes light of a first color $C_1$, such as green, and color selective vertical polarization axis 116 which passes light of a second color $C_2$, such as red. Polarizing filter 112 is a neutral polarizing filter and has a light transmitting horizontal polarization axis 118 which passes white light and light absorbing vertical polarization axis 120 which passes no light. Variable optical retarder 108 comprises a zero to substantially half-wave optical retarder which selectably provides substantially half-wave retardation of normally incident green light in response to the output signals of control circuit 122. The projection 124 of the optic axis of variable optical retarder 108 on its light communicating surfaces 126 and 128 is oriented at 45° angles with respect to the polarization axes of polarizing filters 110 and 112.

Light gate 104 includes variable optical retarder 130 and color selective linear polarizing filter 132. Polarizing filter 132 comprises the light polarizing system of light gate 104. Light gate 104 is a modification of light gate 12' of the exemplary embodiment of FIG. 1 which includes neutral polarizing filter 18'. The configuration of light gate 104 takes advantage of the reciprocal property of a light gate having an electro-optic device disposed between a pair of polarizing filters in that color selective polarizing filter 132 is positioned at the output end of light gate 104 and optical switching system 100. As will be further hereinafter described, the presence of the pair of quarter-wave plates 134 and 136 at the juncture of light gates 102 and 104 eliminates the need in light gate 104 for a neutral polarizing filter corresponding to polarizing filter 18' of light gate 12'.

A light gate constitutes, therefore, an optical switch which either polarizes incident light, as does light gate 102, or receives polarized incident light, as does light gate 104. Each light gate includes at least one electro-optic device means which changes the sense of polarization of light incident thereto and a light polarizing means which serves as an analyzer.

Variable optical retarder 130 comprises a zero to substantially half-wave optical retarder which selectably provides substantially half-wave retardation of green light in synchronism with variable optical retarder 108. Polarizing filter 132 has orthogonally disposed color selective polarization axes 138 and 140 which transmit green and red light, respectively. Polarization axes 138 and 140 are oriented at 45° with respect to projection 142 of the optic axis of variable optical retarder 130 on its light communicating surfaces 144 and 146.

The variable optical retarders 108 and 130 develop for the respective light gates 102 and 104 light intensity patterns which are the same as those shown in FIGS. 3A and 3B. To develop contaminant-free optical transmission states for optical switching system 100 in accordance with the above-described method, the polarization axes of polarizing filter 132 are oriented at 45° angles with respect to the polarization axes of polarizing filters 112 and 116 and projection 142 of the optic axis of variable optical retarder 130 is disposed substantially at 45° angles with respect to the projection 124 of the optic axis of variable optical retarder 108. The polarization axes and projection of the optic axis of the optical components of light gate 102 are shown in phantom on the corresponding optical components of light gate 104 to illustrate the above-described relative alignment.

Quarter-wave plates 134 and 136 are disposed face-to-face between light gates 102 and 104 to maintain the transmissivity of optical switching system 100 at its maximum value. Quarter-wave plates 134 and 136 are preferably tuned to provide quarter-wave retardation of light rays of a midrange color between green and red. A negligible diminution of light intensity which is caused by such mistuning is apportioned nearly equally to the red and green light rays developed at the output of optical switching system 100. Optic axis 148 of quarter-wave plate 134 is disposed at a 45° angle with respect to polarization axes 118 and 120 of polarizing filter 112, and optic axis 150 of quarter-wave plate 136 is disposed at a 45° with respect to polarization axes 138 and 140 of polarizing filter 132.

In a manner analogous to the operation of light gate 12′, light rays of the colors green and red are developed by and exit light gate 102 through horizontal polarization axis of 118 of polarizing filter 112 in, respectively, the first and second optical transmission states.

Whenever variable optical retarders 108 and 130 are commanded to the "ON" optical retardation state by a voltage signal applied to output conductor 152 of control circuit 122, linearly polarized light rays of the color green exit horizontal polarization axis 118 of light gate 102 and strike quarter-wave plate 134 at a 45° angle relative to its optic axis 148. Left-hand circularly polarized light rays of the color green exit quarter-wave plate 134 and strike quarter-wave plate 136 which removes the circular polarization from the light rays propagating between the two light gates. The direction of the linearly polarized light rays of the color green exiting quarter-wave plate 136 is disposed at a 45° angle measured in the counterclockwise direction with respect to its optic axis 150.

Variable optical retarder 130 in its "ON" optical retardation state imparts no change in the direction of polarization of light rays passing therethrough. Linearly polarized light rays of the color green, therefore, emerge from quarter-wave plate 136 and exit light gate 104 and optical switching system 100 through polarization axis 138 in the first optical transmission state. Since the light rays passing through variable optical retarder 130 strike only polarization axis 138 of polarizing filter 132, the system transmissivity remains at its maximum value.

Whenever variable optical retarders 108 and 130 are commanded to the "OFF" optical retardation state by a voltage signal applied to output conductor 152 of control circuit 122, linearly polarized light rays of the color red exit horizontal polarization axis 118 of polarizing filter 112. The light rays of the color red strike quarter-wave plate 134 at a 45° relative to its optic axis 148 and exit quarter-wave plate device 136 at a 45° angle measured in the counterclockwise direction with respect to its optic axis 150 in accordance with the process described above for green light.

Since variable optical retarder 130 in the "OFF" optical retardation state does not provide substantially half-wave retardation of light rays of colors other than green, the direction of polarization of light rays of the color red emerging from quarter-wave plate 136 is rotated at an angle which is slightly different from 90° by variable optical retarder 130. Light rays of the color red, therefore, are separated into components which lie along the polarization axes of polarizing filter 132. Light rays of the color red include major components of light projected onto and transmitted by polarization axis 140 and minor components of light projected onto and absorbed by polarization axis 138 of polarizing filter 132. The slight amount of red light absorbed by polarization axis 138 of polarizing filter 132 results in a virtually imperceptible diminution in red light intensity as respects the intensity of red light transmitted by polarization axis 140.

Linearly polarized light rays of a color red, therefore, emerge from quarter-wave plate 136 and exit light gate 104 and optical switching system 100 through polarization axis 140 in the second optical transmission state. Since substantially all of the light rays passing through variable optical retarder 130 strike only polarization axis 138 of polarizing filter 132, the system transmissivity remains at its maximum value.

The optical components of light gate 102 and quarter-wave plate 134 and the optical components of light gate 104 and quarter-wave plate 136 form, respectively, first and second sections of optical switching system 100 between which circularly polarized light propagates. Since the electric field vector of circularly polarized light has the same magnitude for all azimuths, the first and second sections can be oriented relative to each other about optical path 106 to achieve the desired orientation of the contaminant light intensity pattern without diminishing the system transmissivity from its maximum value.

The operation of the system is unaffected by the position of quarter-wave plate 134 subject to the constraint that it be positioned downstream of variable optical retarder 108. The use of a neutral polarizing filter in light gate 104 is rendered unnecessary by the presence of quarter-wave plate 136 whose optic axis orients the polarization direction of light rays emerging therefrom to strike directly polarization axes 138 and 140 of polarizing filter 132 in light gate 104. The constraint on the position of quarter-wave plate 136 in light gate 104 is that it be upstream of variable optical retarder 130.

Liquid Crystal Variable Optical Retarder

The preferred embodiment of the apparatus of the present invention incorporates a pair of liquid crystal cells operating as zero to substantially half-wave optical retarders 108 and 130. Each such liquid crystal cell controls the retardation of light passing therethrough in response to the intensity of an electric field produced by an excitation voltage applied to the cell electrode structures. The liquid crystal cell described herein exhibits the light intensity patterns depicted in FIGS. 3A and 3B.

With reference to FIG. 6, a liquid crystal cell 200 includes a pair of generally parallel, spaced-apart electrode structures 202 and 204 with nematic liquid crystal material 206 included therebetween. Electrode structure 202 comprises glass dielectric substrate 208 which has on its inner surface a layer 210 of electrically conducting, but optically transparent, material such as indium tin oxide. Director alignment film layer 212 is applied to conductive layer 210 and forms a boundary between electrode structure 202 and liquid crystal material 206. The surface of film 212 which contacts the liquid crystal material is conditioned in accordance with one of two preferred methods to promote a preferred orientation of the directors of the liquid crystal material in contact therewith. The materials constituting and the corresponding methods of conditioning the director alignment film 212 are described in detail hereinbelow. Electrode structure 204 is of a construction similar to that of electrode structure 202, and the components corresponding to those of electrode structure 202 are shown with identical reference numerals followed by primes.

The short length edges of electrode structures 202 and 204 are offset relative to each other to provide access to conductive layers 210 and 210' for connecting at terminals 213 the conductors of the output of control circuit 122. Spacers 214 may be comprised of any suitable material such as glass fiber to preserve the general parallel relation between electrode structures 202 and 204.

With reference to FIGS. 7A and 7B, the nematic director alignment configuration of layers 212 and 212' in liquid crystal cell 200 is described in Column 7, lines 48–55, of U.S. Pat No. 4,333,708 of Boyd, et al. It will be understood, however, that the liquid crystal cell described in the Boyd, et al. patent differs from that of the present invention in that the former includes an alternating-tilt geometry type configuration of which the director alignment of cell 200 comprises only a portion. The cell of the Boyd, et al. patent is constructed to promote disclination movement within the cell in an attempt to provide a bistable switching device.

The film layer 212 of electrode structure 202 is conditioned so that the electrode structure surface contacting directors 216 are aligned parallel to each other at a tilt bias angle $+\theta$, which is measured in the counterclockwise sense with reference to the surface of film layer 212. The film layer 212' of electrode structure 204 is conditioned so that the electrode structure surface contacting directors 218 are aligned parallel to each other at a tilt bias angle $-\theta$ which is measured in the clockwise sense with reference to the surface of film layer 212'. Thus, liquid crystal cell 200 is fabricated so that the surface contacting directors 216 and 218 of the opposed surfaces of director alignment layers 212 and 212' of electrode structures 202 and 204, respectively, are tilt-biased in opposite directions.

A first preferred method of effecting the desired alignment of the surface contacting directors entails the use of polyimide as the material which comprises the alignment film layers 212 and 212' on electrode structures 202 and 204, respectively. Each alignment film layer is rubbed to produce a tilt bias angle $|\theta|$, with 2° to 5° being the preferred range. A second preferred method of effecting the desired alignment of the surface contacting directors entails the use of silicon monoxide as the material which comprises the alignment film layers 212 and 212' of electrode structures 202 and 204, respectively. The silicon monoxide layer is evaporated and vapor deposited preferably at a 5° angle measured from the electrode structure surface in an amount sufficient to produce a tilt bias angle $|\theta|$ of between 10° to 30°, with 15° to 25° being the preferred range.

It will be appreciated that methods for depositing silicon monoxide or other alignment materials to align liquid crystal molecules in a predetermined direction have been disclosed previously by others and are known to those having ordinary skill in the art. One such method, for example, is disclosed in U.S. Pat. No. 4,165,923 of Janning.

FIG. 7A depicts the orientation of surface noncontacting directors 220 when an AC signal $V_1$ of approximately 2 kHz and 20 Vrms is applied to conductive layers 210 and 210' of electrode structures 202 and 204, respectively. The signal $V_1$ on conductive layer 210' constitutes a first switching state produced at the output of control circuit 122 and produces an alternating electric field, E, between electrode structures 202 and 204 within the liquid crystal cell 200 to force the cell into its "ON" optical retardation state. A substantial number of the surface noncontacting directors 220 of a liquid crystal material 206 which has a positive anisotropy value align essentially end-to-end along direction 221 of the electric field flux lines within the cell, which direction is normal to the conditioned surfaces of the electrode structures. Thus, when cell 200 is excited into its "ON" optical retardation state, the surface noncontacting directors 220 are aligned perpendicularly to the surfaces of the cell.

FIG. 7B depicts the orientation of surface noncontacting directors 220 after the signal $V_1$ is removed so that the alignment of surface noncontacting directors is influenced not by an electric field produced between electrode structures 202 and 204 within the cell, but by the intermolecular elastic forces which cause relaxation of the surface noncontacting directors from the end-to-end alignment of the "ON" optical retardation state. The removal of signal $V_1$ constitutes a second switching state produced at the output of control circuit 122. The director orientation shown in FIG. 7B corresponds to that of the "OFF" optical retardation state of the cell.

Switching cell 200 to the "OFF" optical retardation state can also be accomplished by applying to the cell an AC signal $V_2$ produced at the output of control circuit 122 having a voltage level which is less than that of signal $V_1$ and generally about 0.1 V. The frequency of signal $V_2$ is generally the same as that of signal $V_1$.

During the transition from the "ON" optical retardation state to the "OFF" optical retardation state of the liquid crystal cell, the surface noncontacting directors recede from the end-to-end alignment normal to the electrode structure surfaces and attempt to assume a generally parallel relation with the adjacent directors.

Thus, surface noncontacting directors 220a and 220b rotate in a clockwise sense as shown by direction arrows 222a in order to achieve a near-parallel relation as respects directors 216 and 220a, respectively; and surface noncontacting directors 220c and 220d rotate in a counterclockwise sense as shown by direction arrows 222b to achieve a near-parallel relation as respects directors 218 and 220c, respectively. Thus, when cell 200 relaxes to its "OFF" optical retardation state, each one of a substantial number of the surface noncontacting directors is aligned so that it projects a director component onto the surfaces of the cell. The surface noncontacting directors, however, lie approximately in a plane which is perpendicular to the surfaces of the cell.

The method of operating the liquid crystal cell 200 as a zero to substantially half-wave optical retarder is directed to the disclination-free surface noncontacting director relaxation from the electric field aligned or "ON" optical retardation state depicted by FIG. 7A to the planar configuration or "OFF" optical retardation state depicted by FIG. 7B.

In the present invention, liquid crystal cell 200 is operated as a zero to substantially half-wave optical retarder whose optic axis corresponds to the alignment direction of the nonsurface contacting directors 220.

Linearly polarized light which propagates in direction 226 normal to the surfaces of electrode structures 202 and 204 is coincident with the direction of surface noncontacting directors 220 when the liquid crystal cell is in the "ON" optical retardation state. Directors 220 are oriented in such "ON" optical retardation state so that there is a negligible projection of the optic axis on the electrode structure surfaces of the cell. Under these conditions, liquid crystal cell 200 produces substantially reduced optical retardation for incident light propagating in the direction 226.

Linearly polarized light which propagates in direction 226 normal to the surfaces of electrode structures 202 and 204 is noncoincident with the alignment direction of surface noncontacting directors when the liquid crystal cell is in the "OFF" optical retardation state. Directors 220 are oriented in such "OFF" optical retardation state so that each one of a substantial number of them projects a component on the electrode structure surfaces of the cell. Under these conditions, liquid crystal cell 200 has an effective birefringence for generally normally incident light. The orientation of surface noncontacting directors 220 provides substantially half-wave optical retardation for light of the wavelength which satisfies the mathematical expression:

$$\Delta nd/\lambda = \tfrac{1}{2}$$

where d represents the thickness 228 and $\Delta n$ represents the effective birefringence of the cell.

It will be obvious to those having skill in the art that many changes may be made in the above-described details of the preferred embodiment of the present invention. The scope of the present invention, therefore, should be determined only by the following claims.

I claim:

1. In an optical switching system in optical communication with a source of light rays and comprising a first light gate which includes a first electro-optic device means and provides an optical transmission state having associated therewith a contaminant light intensity pattern with points of local minima and maxima, a contaminant light intensity compensation method comprising:

positioning a second light gate to receive the light rays transmitted through the output of the first light gate, the second light gate including a second electro-optic device means to provide an optical transmission state having associated therewith a contaminant light intensity pattern with points of local minima and maxima;

introducing circular polarization of and removing the circular polarization from the light rays propagating between the first and second electro-optic device means; and orienting the contaminant light intensity patterns of first and second light gates so that the points of local minima and maxima of the contaminant light intensity pattern of one of the light gates generally align with the respective points of local maxima and minima of the contaminant light intensity pattern of the other light gate, thereby to provide independent of viewing angle an optical transmission state of substantially contaminant-free light in a system whose transmissivity remains essentially constant at its maximum value.

2. The method of claim 1 in which the introduction and removal of circular polarization are accomplished by positioning a first optical retardation device downstream of the first electro-optic device means and a second optical retardation device upstream of the second electro-optic device means.

3. The method of claim 2 in which the first and second optical retardation devices comprise quarter-wave plates and the first and second electro-optic device means comprise zero to substantially half-wave optical retarders.

4. The method of claim 1 in which the first and second light gates are disposed along an optical path and the contaminant light intensity patterns thereof are oriented by adjusting the relative angular position of the first and second electro-optic device means about the optical path.

5. The method of claim 1 in which the source of light rays emits light rays of a plurality of wavelengths, and the first light gate comprises a first polarizing system and the second light gate comprises a second polarizing system, each one of the polarizing systems having at least one color selective polarizing filter means, thereby to provide two system optical transmission states of light of different colors.

6. A contaminant light intensity-compensated optical switching system in optical communication with a source of light rays, comprising:

first light gate means including a first electro-optic device means to provide an optical transmission state having associated therewith a contaminant light intensity pattern with points of local minima and maxima;

second light gate means including a second electro-optic device means to provide an optical transmission state having associated therewith a contaminant light intensity pattern with points of local minima and maxima;

the second light gate being positioned to receive the light rays transmitted by the first light gate and the contaminant light intensity pattern of the second light gate being oriented so that the points of local minima and maxima of the contaminant light intensity pattern of one of the light gates generally align with the respective points of local maxima and minima of the contaminant light intensity pattern of the other light gate;

first means to introduce circular polarization of and second means to remove the circular polarization from the light rays propagating between the first and second electro-optic device means; and control means in communication with the first and second electro-optic device means to form a system whose transmissivity remains essentially constant at its maximum value and which provides independent of viewing angle an optical transmission state of substantially contaminant-free light.

7. The optical switching system of claim 6 which includes first and second sections disposed along an optical path, the first section comprising the first electro-optic device means and the first means to introduce circular polarization and the second section comprising the second electro-optic device means and the second means to remove the circular polarization, the contaminant light patterns being oriented by adjusting the relative angular position of the first and second sections about the optical path.

8. The optical switching system of claim 6 in which the source of light rays emits light rays of a plurality of wavelengths, and the first light gate includes a first polarizing system and the second light gate comprises a second polarizing system, each one of the polarizing systems having at least one color selective polarizing filter means, thereby to provide two optical transmission states of light of different colors.

9. The optical switching system of claim 6 in which the first means to introduce circular polarization comprises a first optical retardation device positioned downstream of the first electro-optic device means and the second means to remove the circular polarization comprises a second optical retardation device positioned upstream of the second electro-optic device means.

10. The optical switching system of claim 9 in which the first and second optical retardation devices comprise quarter-wave plates and the first and second electro-optic device means comprise zero to substantially half-wave optical retarders.

11. The optical switching system of claim 6 in which at least one of the first and second electro-optic device means comprises a variable optical retarder.

12. The optical switching system of claim 11 in which the variable optical retarder includes a liquid crystal cell comprising liquid crystal material which has directors and is contained between a pair of opposed, spaced-apart optically transparent electrode structures, each electrode structure including a layer of optically transparent and electrically conductive material and the inner surface of each electrode structure having been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to the tilt bias angles of the directors in contact with the other conditioned surface.

* * * * *